March 2, 1943.    A. A. LEONARD ET AL    2,312,562
PHOTOGRAPHIC APPARATUS
Filed April 11, 1941    2 Sheets-Sheet 1
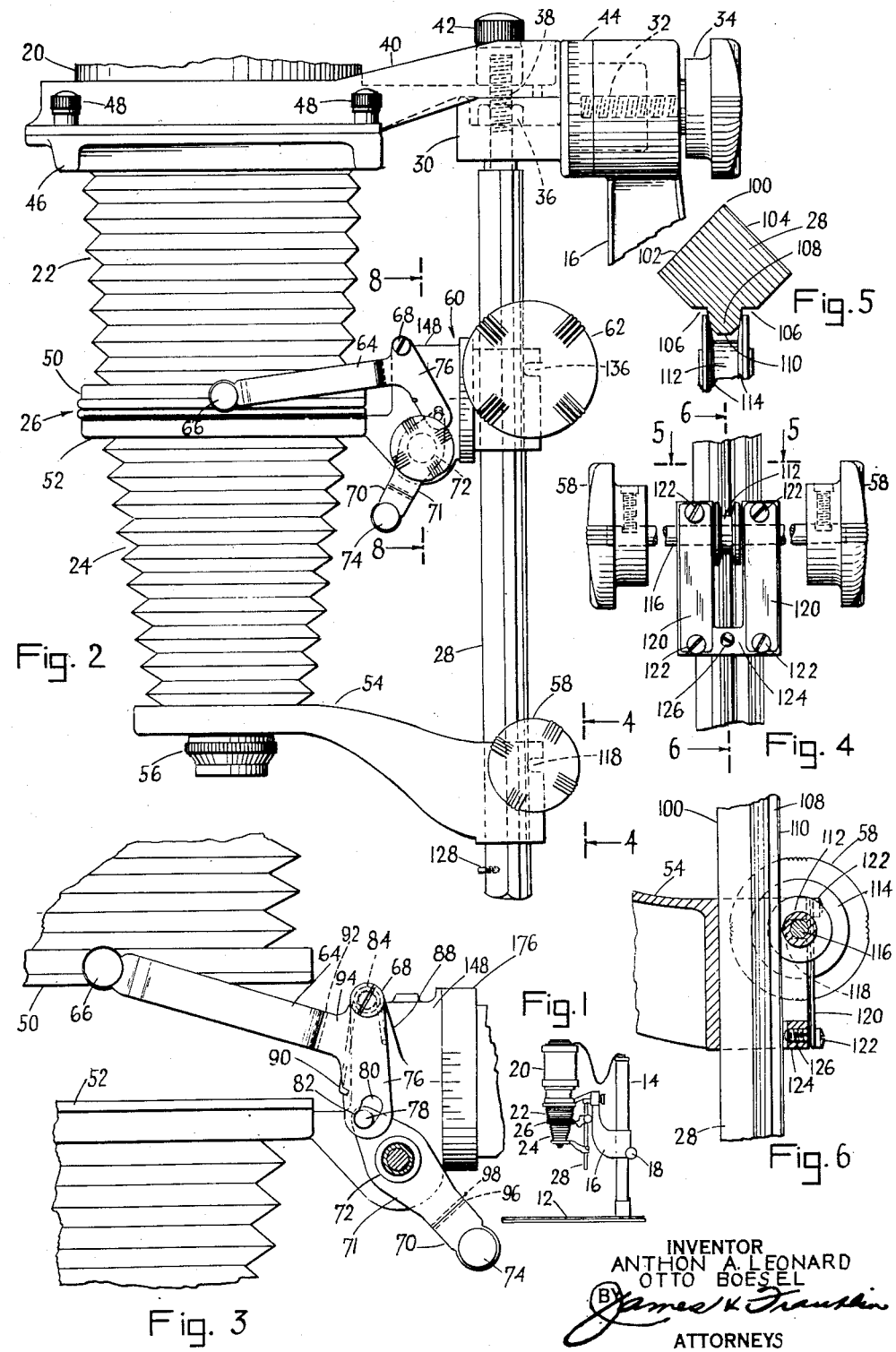
INVENTOR
ANTHON A. LEONARD
OTTO BOESEL
ATTORNEYS March 2, 1943.  A. A. LEONARD ET AL  2,312,562
PHOTOGRAPHIC APPARATUS
Filed April 11, 1941  2 Sheets-Sheet 2
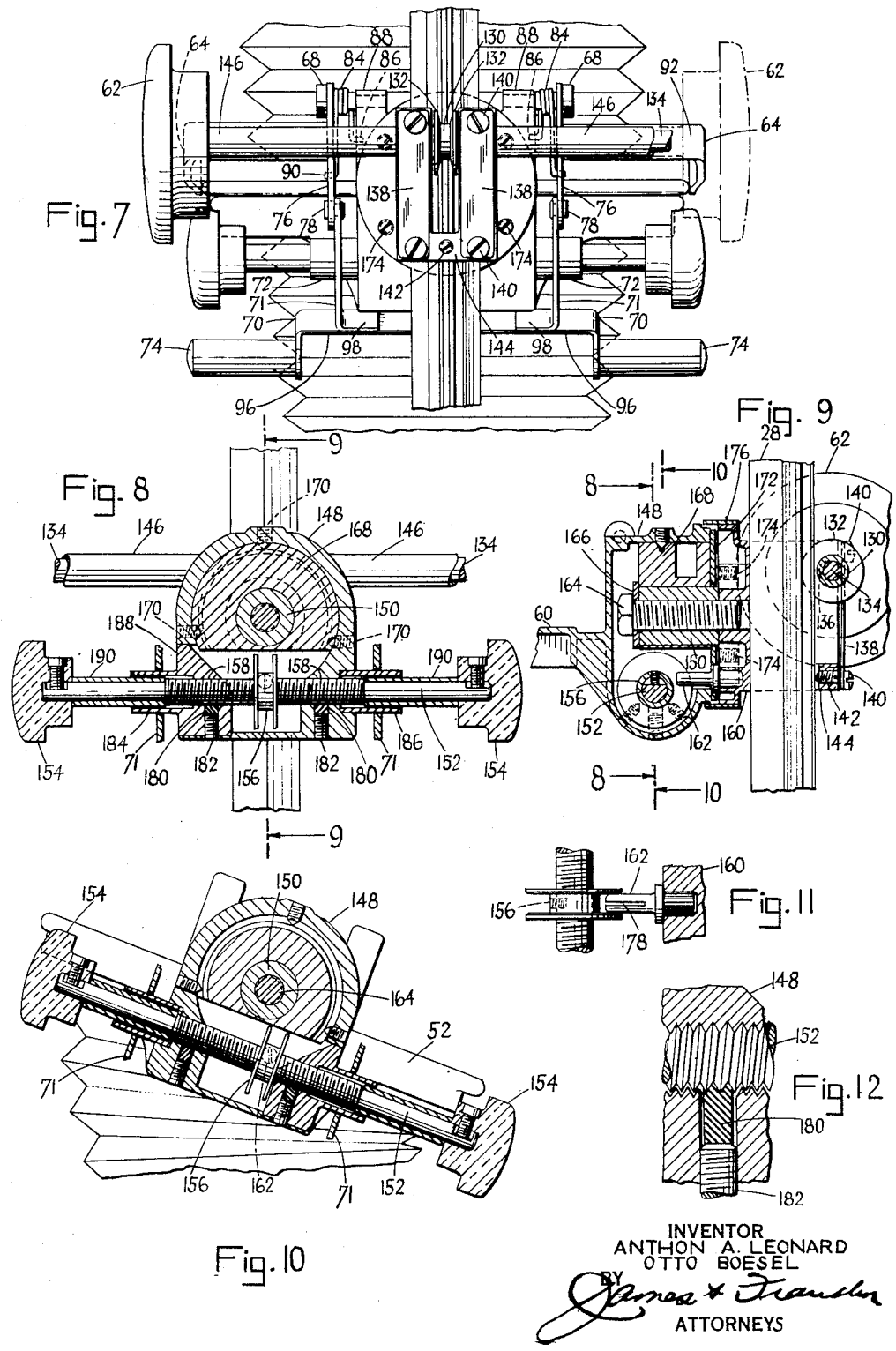
INVENTOR
ANTHON A. LEONARD
OTTO BOESEL
BY James & Franklin
ATTORNEYS Patented Mar. 2, 1943

2,312,562

UNITED STATES PATENT OFFICE 2,312,562

PHOTOGRAPHIC APPARATUS

Anthon A. Leonard, Glenside, Pa., and Otto Boesel, Shelton, Conn., assignors to DeJur-Amsco Corporation, Shelton, Conn., a corporation of New York Application April 11, 1941, Serial No. 388,010

18 Claims. (Cl. 88—24)

This invention relates to photographic apparatus, and more particularly to enlargers and their control mechanism.

The primary object of our invention is to generally improve photographic enlargers, and more particularly the control mechanism for adjusting and operating the same.

Further objects of the invention center about the provision of improved mechanism for focusing by movement of either the negative stage or the lens stage, or both. Another object is to provide improved, simplified, and readily operable mechanism for opening and closing the negative stage. Still further objects concern the provision of improved mechanism for tilting the negative stage, as is sometimes done to overcome distortion, or for special photographic effects.

Still another object is to so arrange the enlarger that the lamp house and bellows may be turned from vertical to horizontal position for use as a wall projector. In accordance with a further feature and object of the invention, the lamp house and upper bellows are readily removable, and the lower bellows is adapted to receive a camera back, thus enabling the apparatus to be used as a camera having a swing back, the back being swung by the negative stage tilting apparatus previously referred to.

To the accomplishment of the foregoing, and other more specific objects which will hereinafter appear, our invention consists in the apparatus elements and their relation one to the other, as hereinafter are more particularly described in the specification and sought to be defined in the claims. The specification is accompanied by drawings in which:

Fig. 1 is a side elevation of the enlarger;

Fig. 2 is a side elevation of the upper and lower bellows with associated control mechanism, drawn to larger scale;

Fig. 3 is a fragmentary view similar to Fig. 2, but showing the negative stage in open position;

Fig. 4 is a rear elevation of the control for the lens stage, looking in the direction of the arrows 4—4 of Fig. 2;

Fig. 5 is a fragmentary horizontal section through the track, drawn to enlarged scale, and taken approximately in the plane of the line 5—5 of Fig. 4;

Fig. 6 is a section taken in the plane of the line 6—6 of Fig. 4;

Fig. 7 is a rear view of the control mechanism for the negative stage;

Fig. 8 is a transverse section through the mechanism for tilting the negative stage, and is taken approximately in the plane of the line 8—8 of Figs. 2 and 9, the levers for opening the negative stage being omitted in order to simplify the drawing;

Fig. 9 is a section taken in the plane of the line 9—9 of Fig. 8;

Fig. 10 is a transverse section taken in the plane of the line 10—10 of Fig. 9, and showing the negative stage in tilted position;

Fig. 11 is a detail showing the stationary reaction pin for the tilting mechanism; and Fig. 12 is a detail showing the friction blocks used with the threaded control rod of the tilting mechanism.

Referring to the drawings, and more particularly to Fig. 1, the enlarger comprises a base 12 having a post or column 14 projecting upwardly therefrom. A bracket 16 is slidable on column 14, its weight being counterbalanced by a suitable spring balance. A knob 18 may be used to lock bracket 16 in adjusted position. Bracket 16 carries a lamp house 20 with upper and lower bellows 22 and 24 therebeneath, said bellows having a negative stage 26 therebetween. The bellows are adjustable along a track 28 carried by bracket 16.

Referring now to Fig. 2, the bracket 16 terminates in a rotatable head 30, said head being locked in position by means of a screw 32 and knob 34. The head 30 has the track 28 rigidly secured thereto, as by means of nut 36 received on the threaded end 38 of track 28. The lamp house 20 is carried by an arm 40 which is detachably mounted on head 30, as by means of thumb nut 42 also received on the threaded end 38 of the track. It will be understood that by turning knob 34 to loosen screw 32, the head 30 may be turned, thus bodily swinging the lamp house, bellows, and track assembly to any desired angle, this angle being measurable on a micrometer scale 44. Thus the enlarger head may be swung from vertical to horizontal position for wall projection.

The upper end of bellows 22 terminates in a frame 46 which is secured to arm 40 by screws 48. The lower end of bellows 22 terminates in the upper platen 50 of negative stage 26. The upper end of bellows 24 is secured to the lower platen 52 of the negative stage. The lower end of bellows 24 is carried by an arm 54, and is provided with an appropriate lens board and lens 56. The lens is detachably mounted for interchange with other lenses. The arm 54 is moved along track 28 by means of either of two control knobs 58, only one of which is shown in Fig. 2, but both of which are shown in Fig. 4. The lower platen 52 of the negative stage is carried by an arm generally designated 60, this being moved along track 28 by means of either of two knobs 62, only one of which is shown in Fig. 2, but both of which are indicated in Fig. 7.

The negative stage may be opened by raising the upper platen 50, this being carried by angle levers 64. The angle levers 64 are detachably connected to the upper platen 50 by means of two thumb screws 66, one on each side of the platen, only one being shown in the drawings. By removing the thumb screws 66 and the thumb nut 42, the lamp house and upper bellows may be bodily removed with the arm 40. A camera back may then be applied to the lower platen 52, thus permitting the lower bellows 24 and associated control mechanism to be used as a camera for title making, copying, color reproduction, and photo-micrography, all while in vertical position, or for more normal camera purposes when swung to horizontal position, as previously described. Moreover, the resulting camera may be used as a swing-back camera because of the tilting mechanism for the negative stage hereinafter described.

The angle levers 64 for opening the negative stage are pivoted at 68 (Figs. 2, 3 and 7). They are controlled by levers 70 pivoted at 72 and having operating handles 74 at their lower ends. The levers 70 are connected at their upper ends to the short arms 76 of the angle levers by means of pins 78 operating in slots 80. By comparison of Figs. 2 and 3, it will be seen that the slots 80 compensate for angularity of the levers when moving a handle 74 from the forward position shown in Fig. 2, to the rearward position shown in Fig. 3. Moreover, referring to Fig. 3, it will be seen that the lower end 82 of slot 80 is turned to a direction substantially perpendicular to the operating lever 70. More specifically, slot portion 82 is perpendicular to a line extending from pin 78 to pivot 72. Thus the mechanism is self-locking in its open position.

This is convenient because the negative stage is preferably provided with springs to normally close the same. In the present case, the short arms 76 of angle levers 64 are normally urged in closing direction by springs 84 (Figs. 3 and 7) which are coiled about the bearings 68, and have their inner ends 86 received in mating holes in bearing 88, while their outer ends 90 are turned against the arms 76. Thus the platens 50 and 52 may be normally held tightly together by the action of springs 84, yet when either of handles 74 is moved to open the negative stage, the stage remains open during handling and placing of the negative, etc., and until the handle 74 is moved back toward closing position.

Structurally, the angle levers 64 and the operating levers 70 are preferably rigidly connected together so as to move simultaneously and equally, it being understood that only one of the handles 74 need be operated, these handles being provided in duplicate solely for the convenience of the operator, who may use either his left or his right hand. Various other controls hereinafter described are similarly duplicated for the same reason.

Referring to Fig. 7, it will be seen that the outer parts 64 of the angle levers are formed integrally with a cross-connection 92, by appropriately bending a single piece of metal. The short arms 76 are disposed much nearer together than the arms 64, and extend forwardly, as is indicated at 94 in Fig. 3, and are then bent at right angles, where they may be spot-welded or otherwise secured to the cross-connection 92 of the arms 64. Reverting to Fig. 7, it will be seen that the handles 74 are secured on short arms formed integrally with a cross-bar 96. The upper or pivoted portions 71 of the levers are formed separately and are bent at right angles at 98, where they are spot-welded or otherwise secured to the cross-bar 96. In this way a rigid, smooth-acting control mechanism is provided for opening and closing the negative stage.

Referring now to Figs. 4, 5 and 6, it will be seen that the track 28 is a generally square rod having a corner 100 pointed toward the bellows. This provides faces 102 and 104 against which mating parts of the arms 54 and 60 may bear with an accurate fit. The rear faces of track 28 are milled or cut away at 106 to form a rail 108. The rear corner is also preferably cut down to form a flat edge 110 for cooperation with a stop screw later referred to.

The rear end of arm 54 is provided with a wheel 112 provided with preferably tapered flanges 114 dimensioned to frictionally engage the sides of rail 108. Wheel 112 is secured to a shaft 116 carrying control knobs 58 at its ends. Shaft 116 is received in open slots 118 (Fig. 2) at the rear end of arm 54. The shaft is held in slots 118 by means of leaf springs 120 (Figs. 4 and 6), these springs being tightened by screws 122 at their upper and lower ends. It will be seen in Fig. 6 that arm 54 is held tightly against track 28 by the pressure of the wheel 112. Shaft 116 does not reach the inner ends of slots 118, and springs 120 bear yieldably against shaft 116 while still spaced from the end of arm 54. In this way the desired frictional engagement between wheel 112 and track 28 is maintained for years, and at the same time, an accurate fit or wedging of arm 54 against the forward surfaces of track 28 is assured. Should the frictional action be reduced after long use, the screws 122 may be tightened somewhat to increase the spring tension and so restore the desired degree of friction.

The bifurcated ends of arm 54 are bridged at 124. A stop screw 126 is threadedly received in bridge 124. This screw is adjusted to approach but not quite touch the rear edge 110 of track 28, as will be seen in Fig. 6. Thus in normal operation the screw serves no particular function, but it is desirable in order to limit the movement of arm 54 in the event that the arm is accidentally pushed upwardly. Referring to Fig. 2, a small stop screw or pin 128 may be provided at the bottom of track 28 to prevent excessive downward movement of arm 54.

The mechanism for moving the arm 60 and negative stage 26 along track 28 is substantially the same as that just described for the arm 54. Thus, in Figs. 7 and 9, it will be seen that the upper arm is provided with a wheel 130 having sloping flanges 132 and carried on a shaft 134 having control knobs 62 at the ends thereof. Shaft 134 is carried in open slots 136, and is urged toward track 28 by spring strips 138 adjusted by screws 140. A stop screw 142 may be provided on bridge 144. Tubular sleeves 146 may be provided around shaft 134, if desired, these extending between the bearing slots 136 and the knobs 62. However, these spacer tubes are not essential.

The mechanism for tilting the negative stage may be described with reference to Figs. 8 through 12 of the drawings. The support arm heretofore generally designated 60, comprises a housing 148 which is rotatable about a bearing 150. The action is controlled by a threaded rod 152 having control knobs 154 at its ends and having a flanged collar 156 at its center. The housing 148 is threaded at 158 to receive the threaded rod 152, and the latter therefore moves axially through the housing when the knobs 154 are rotated. This is accompanied by axial movement of collar 156.

Referring now to Figs. 9 and 11, the non-rotatable part or sliding shoe 160 carries a fixed pin 162. This pin is offset from the axis of bearing 150, and is preferably located beneath the same. The end of pin 162 is received between the flanges of collar 156. It will be understood that rotation of the control knobs 154 causes oscillation of the housing 148, as will be clearly seen in Fig. 10, the platen 52 of the negative stage being tilted when collar 156 is moved toward one side of the housing, for the pin 162 remains stationary in its position directly beneath the axis of bearing 150.

Considering the structure in greater detail, the bearing 150 is rigidly secured to the slidable shoe 160 by means of a bolt 164 (Fig. 9). This preferably also holds a thrust washer 166 which anchors an outer bearing or filler piece 168 on the inner stationary bearing 150. The lower part of outer bearing 168 is cut away at the bottom to clear the collar 156. The housing 148 is received over the outer bearing 168, and is rigidly secured thereto by means of pointed set screws 170. The object of this arrangement is to facilitate assembly of the parts while concealing and housing the internal mechanism.

The desired frictional resistance, and the elimination of play, is preferably obtained by using a friction back plate 172 which is normally urged forwardly against outer bearing 168 by means of four adjusting screws 174 which may bear directly against plate 172, or may bear against the same through intermediate plugs made of resilient material.

A ring 176 having a micrometer scale thereon may be secured about the circular rim of slidable shoe 160 for purposes of measurement of the angle over which the negative stage is tilted.

Referring to Fig. 11, it will be seen that the stationary pin 162 is slotted at 178. This is desirable in order to provide a snug but yieldable fit between the pin and the flanges of collar 156, thus avoiding lost motion or play when reversing the direction of motion of the control knobs.

Referring to Figs. 8 and 12, the housing 148 may be provided with plugs 180 made of fibre or other suitable material, said plugs being pressed against the threaded rod 152 by screws 182. This avoids play or lost motion between the male and female threads, and any looseness which may develop over long wear, may be eliminated by readjusting the screws 182.

In Fig. 8, it will be seen that the threaded rod 152 is surrounded by short outwardly projecting sleeves 184 and 186. The sleeve 184 is cast integrally with an openable side portion 188 of housing 148, this being openable to receive the collar 156. The sleeve 186 is inserted in housing 148. Both sleeves are concentric with the rod, and they function not only to conceal the threads when the rod is screwed in one direction or the other, but also act as bearings for the control levers 71 which open and close the negative stage. In other words, these levers turn about the axis of threaded rod 152, but actually are carried on the sleeves 184 and 186.

Additional tubular sleeves 190 may be provided around the ends of rod 152, these acting as spacers between the threaded portion of the rod and the knobs 154. Their use is optional.

It is believed that the construction and operation, as well as the many advantages of our improved enlarger will be apparent from the foregoing detailed description thereof.

Focusing may be accomplished by either lens focusing, or negative focusing, or both. The negative stage may be tilted for distortion correction or for other purposes. The enlarger head may be used for wall projection as well as for vertical projection. The bellows and track assembly may be used for photographic purposes, the tiltable negative stage providing a swingback mechanism. When in vertical position, the camera may be used for photomicrography by placing a microscope therebeneath.

All controls have a smooth, convenient, precision action. The controls are dual controls so that either the left or right hand may be used. Most of the parts are die-cast, and all are rugged and strong, so as to provide a sturdy, vibration-free structure. The various friction movements are arranged to last for the life of the unit, and any loss of friction may be taken up by special adjustments provided at all points of wear. The negative stage is normally held tightly closed by an appropriate spring action, yet is readily opened at either side of the enlarger, and when opened, remains open until closed, thus freeing both hands of the operator. The rotational movements may be accurately measured by appropriate micrometer scales. The opening and closing of the negative stage is not interfered with in any way when the stage is tilted.

It will be apparent that while we have shown and described our invention in a preferred form, many changes and modifications may be made in the structure disclosed, without departing from the spirit of the invention as sought to be defined in the following claims.

We claim:

1. An enlarger comprising an upper bellows, a lower bellows, separable platens therebetween forming a negative stage, and means to raise the upper platen in order to open the negative stage, said means comprising an angle lever connected to the platen, a spring normally urging the platen to closed position, an operating lever pivotally connected to the angle lever, the connection between said operating lever and angle lever including a pin and slot to compensate for angularity, one end of said slot being in such direction that the mechanism is self-locking in the open position.

2. An enlarger comprising an upper bellows, a lower bellows, separable platens therebetween forming a negative stage, and means to raise the upper platen in order to open the negative stage, said means comprising angle levers disposed on opposite sides of the platen and connected thereto, operating levers having a handle at one end and pivotally connected to the angle levers at the opposite end, the connection between said operating lever and angle lever including means whereby said mechanism is self-locking in the open position, and springs normally urging said levers in such direction as to close the negative stage.

3. An enlarger comprising an upper bellows, a lower bellows, separable platens therebetween forming a negative stage, and means to raise the upper platen in order to open the negative stage, said means comprising angle levers disposed on opposite sides of the platen and connected thereto, springs coiled about the pivots of said angle levers and normally urging the same in such direction as to close the negative stage, operating levers having a handle at one end and pivotally connected to the angle levers at the opposite end, the connection between said operating lever and angle lever including a pin and slot to compensate for angularity, one end of said slot being turned in such direction as to be perpendicular to the direction of the operating lever when the negative stage is opened, whereby said mechanism is self-locking in the open position, and means connecting said levers together for simultaneous equal operation.

4. An enlarger comprising an upper bellows, a lower bellows, separable upper and lower platens therebetween constituting a negative stage, and means to tilt the negative stage, said means comprising a threaded rod having a flanged collar, a housing secured to the negative stage and threadedly receiving said rod, a stationary bearing on which said housing is oscillatably mounted, and a stationary pin projecting from said bearing at a point offset from the axis of the bearing and disposed between the flanges of said flanged collar, whereby rotation of the threaded rod causes tilting of the negative stage.

5. An enlarger comprising an upper bellows, a lower bellows, separable upper and lower platens therebetween constituting a negative stage, and means to tilt the negative stage, said means comprising a threaded rod having operating handles at its ends and a flanged collar at the middle, a housing rigidly secured to the negative stage and threadedly receiving said rod, a stationary bearing on which said housing is oscillatably mounted, and a stationary pin projecting from said bearing at a point offset from the axis of the bearing and disposed between the flanges of said flanged collar, whereby rotation of the threaded rod causes tilting of the negative stage.

6. An enlarger comprising a base, a post extending upwardly therefrom, a support bracket slidable on said post, a lamp house mounted on said support bracket, a track depending from said bracket, a bellows beneath said lamp house, an arm extending from the lower end of the bellows to said track and having a slide portion slidable thereon, said arm tending normally to tilt downward, a wheel on the upper end of said slide portion of said arm frictionally engaging the back of the track, adjustable springs urging said wheel against the track, a handle for rotating said wheel to raise or lower the arm, and a stop screw at the lower end of the slide portion of said arm, said stop screw being adjusted to approach but normally not bear against the rear of the track, said stop screw limiting upward tilting of the aforesaid arm.

7. An enlarger comprising a base, a post extending upwardly therefrom, a support bracket slidable on said post, a lamp house mounted on said support bracket, a track depending from said bracket, upper and lower bellows beneath said lamp house with separable platens therebetween forming a negative stage, an arm extending from said negative stage to said track and having a slide portion slidable thereon, said arm tending normally to tilt downward, a wheel on the upper end of said slide portion of said arm frictionally engaging the back of the track, adjustable springs urging said wheel against the track, a handle for rotating said wheel to raise or lower the arm, and a stop screw at the lower end of the slide portion of said arm, said screw being adjusted to approach but normally not bear against the rear of the track, said stop screw limiting upward tilting of the aforesaid arm.

8. An enlarger comprising a base, a post extending upwardly therefrom, a support bracket slidable on said post, a lamp house mounted on said support bracket, a track depending from said bracket, upper and lower bellows beneath said lamp house with separable platens therebetween forming a negative stage, an arm extending from said negative stage to said track and slidable thereon, an arm extending from the lower end of the bellows to said track and slidable thereon, wheels on said arms frictionally engaging the track, adjustable springs urging said wheels against the track, and handles for rotating said wheels to raise or lower the arms.

9. An enlarger comprising a base, a post extending upwardly therefrom, a support bracket slidable on said post, a lamp house mounted on said support bracket, a track depending from said bracket, upper and lower bellows beneath said lamp house with separable platens therebetween forming a negative stage, an arm extending from said negative stage to said track and slidable thereon, an arm extending from the lower end of the bellows to said track and slidable thereon, wheels on said arms frictionally engaging the track, adjustable springs urging said wheels against the track, handles for rotating said wheels to raise or lower the arms, and stop screws adjusted to approach but not bear against the rear of the track, said stop screws limiting upward tilting of the aforesaid arms.

10. An enlarger comprising a base, a post extending upwardly therefrom, a support bracket slidable on said post, a head rotatably mounted at the end of said bracket by pivot means having a horizontal axis extending in a direction between the lamp housing and the post, a track depending from said head, a lamp house detachably mounted on said head, upper and lower bellows beneath said lamp house with separable platens therebetween forming a negative stage, means detachably connected to the upper platen for opening or closing the negative stage, an arm extending from the lower end of the bellows to said track and slidable thereon, a wheel on said arm frictionally engaging the track, and a handle for rotating said wheel to raise or lower the arm, the rotatable mounting at the end of the bracket being such that the lamp house, bellows and track may be turned with the rotatable head for use as a wall projector, and the lamp house and upper bellows may be removed to permit use of the lower bellows and track as a camera.

11. An enlarger comprising a base, a post extending upwardly therefrom, a support bracket slidable on said post, a head rotatably mounted at the end of said bracket by pivot means having a horizontal axis extending in a direction between the lamp housing and the post, a track depending from said head, a lamp house detachably mounted on said head, upper and lower bellows beneath said lamp house with separable platens therebetween forming a negative stage, an arm extending from the lower platen to said track and slidable thereon, means detachably connected to the upper platen for opening or closing the negative stage, a wheel on said arm frictionally engaging the track, and a handle for rotating said wheel to raise or lower the arm, the rotatable mounting at the end of the bracket being such that the lamp house, bellows and track may be turned with the rotatable head for use as a wall projector, and the lamp house and upper bellows may be removed to permit use of the lower bellows and track as a camera.

12. An enlarger comprising a base, a post extending upwardly therefrom, a support bracket slidable on said post, a head rotatably mounted at the end of said bracket, a track depending from said head, a lamp house detachably mounted on said head, upper and lower bellows beneath said lamp house with separable platens therebetween forming a negative stage, an arm extending from the lower platen to said track and slidable thereon, means carried by said arm detachably connected to the upper platen for opening or closing the negative stage, an arm extending from the lower end of the bellows to said track and slidable thereon, wheels on said arms frictionally engaging the track, and handles for rotating said wheels to raise or lower the arms, the arrangement being such that the lamp house, and bellows and track may be turned with the rotatable head for use as a wall projector, and the lamp house and upper bellows may be removed to permit use of the lower bellows and track as a camera.

13. An enlarger comprising a base, a post extending upwardly therefrom, a support bracket slidable on said post, a head rotatably mounted at the end of said bracket, a track depending from said head, a lamp house detachably mounted on said head, upper and lower bellows beneath said lamp house with separable platens therebetween forming a negative stage, means detachably connected to the upper platen for opening or closing the negative stage, means to tilt the lower platen, an arm extending from the bellows to said track and slidable thereon for focusing, a wheel on said arm frictionally engaging the track, and a handle for rotating said wheel in order to raise or lower the arm, the arrangement being such that the lamp house, and bellows and bracket may be turned with the rotatable head for use as a wall projector, and the lamp house and upper bellows may be removed to permit use of the lower bellows and track as a swing-back camera.

14. An enlarger comprising an upper bellows, a lower bellows, separable platens therebetween forming a negative stage, means to tilt the negative stage, said means comprising a threaded rod having an operating handle and a flanged collar, a housing rigidly secured to the lower platen and threadedly receiving said rod, a stationary bearing on which said housing is oscillatably mounted, a stationary pin projecting from said bearing at a point offset from the axis of the bearing and disposed between the flanges of said flanged collar, means to raise the upper platen in order to open the negative stage, said means comprising linkage mounted on said housing and connected to said platen, a spring normally closing the negative stage, an operating handle for said linkage, said linkage including means whereby the mechanism is self-locking in the open position.

15. An enlarger comprising an upper bellows, a lower bellows, separable platens therebetween forming a negative stage, means to tilt the negative stage, said means comprising a threaded rod having an operating handle and a flanged collar, a housing rigidly secured to the lower platen and threadedly receiving said rod, a stationary bearing on which said housing is oscillatably mounted, a stationary pin projecting from said bearing at a point offset from the axis of the bearing and disposed between the flanges of said flanged collar, sleeves projecting from said housing around said rod, means to raise the upper platen in order to open the negative stage, said means comprising angle levers disposed on opposite sides of the platen and pivoted on said housing, springs normally closing the negative stage, operating levers pivoted on said sleeves and having a handle at one end and pivotally connected to the angle levers at the opposite end, the connection between said operating lever and angle lever including a pin and slot to compensate for angularity, one end of said slot being turned in such direction as to be perpendicular to the operating lever when the negative stage is opened, whereby said mechanism is self-locking in the open position, and means connecting said levers together for simultaneous equal operation.

16. An enlarger comprising a base, a post extending upwardly therefrom, a support bracket slidable on said post, a lamp house mounted on said bracket, a track depending from said bracket, upper and lower bellows beneath said lamp house with separable platens therebetween forming a negative stage, an arm extending from said lower platen to said track and slidable thereon, said arm including a housing rigidly secured to the lower platen, a non-rotatable bearing slidable on the track, said housing being oscillatably mounted on said bearing, a rod threadedly received transversely of the housing, said rod having an operating handle and a flanged collar, and a stationary pin projecting from the stationary bearing at a point offset from the axis of the bearing and disposed between the flanges of said flanged collar, whereby rotation of the threaded rod causes tilting of the negative stage.

17. An enlarger comprising a base, a post extending upwardly therefrom, a support bracket slidable on said post, a lamp house mounted on said bracket, a track depending from said bracket, upper and lower bellows beneath said lamp house with separable platens therebetween forming a negative stage, an arm extending from said lower platen to said track and slidable thereon, means including a handle and a wheel rotated thereby and bearing against said track for moving the arm along the track, said arm including a housing rigidly secured to the lower platen, a non-rotatable bearing slidable on the track, said housing being oscillatably mounted on said bearing, a rod threadedly received transversely of the housing, said rod having operating handles at its ends and a flanged collar at the middle, and a stationary pin projecting from the stationary bearing at a point offset from the axis of the bearing and disposed between the flanges of said flanged collar, whereby rotation of the threaded rod causes tilting of the negative stage.

18. An enlarger comprising an upper bellows, a lower bellows, separable platens therebetween forming a negative stage, means to tilt the negative stage, said means comprising a housing secured to the lower platen, and a non-rotatable bearing on which said housing is oscillatably mounted, means to raise the upper platen in order to open the negative stage, said means comprising angle levers disposed on opposite sides of the platen and connected thereto, resilient means normally urging the platen to closed position, operating levers pivotally connected to the angle levers, the connection between said operating levers and angle levers including pins and slots to compensate for angularity, one end of a slot being turned in such direction that the mechanism is self-locking in the open position, said assembly of levers being mounted on and tilting with the housing and negative stage.

ANTHON A. LEONARD.
OTTO BOESEL.